United States Patent Office 3,783,126
Patented Jan. 1, 1974

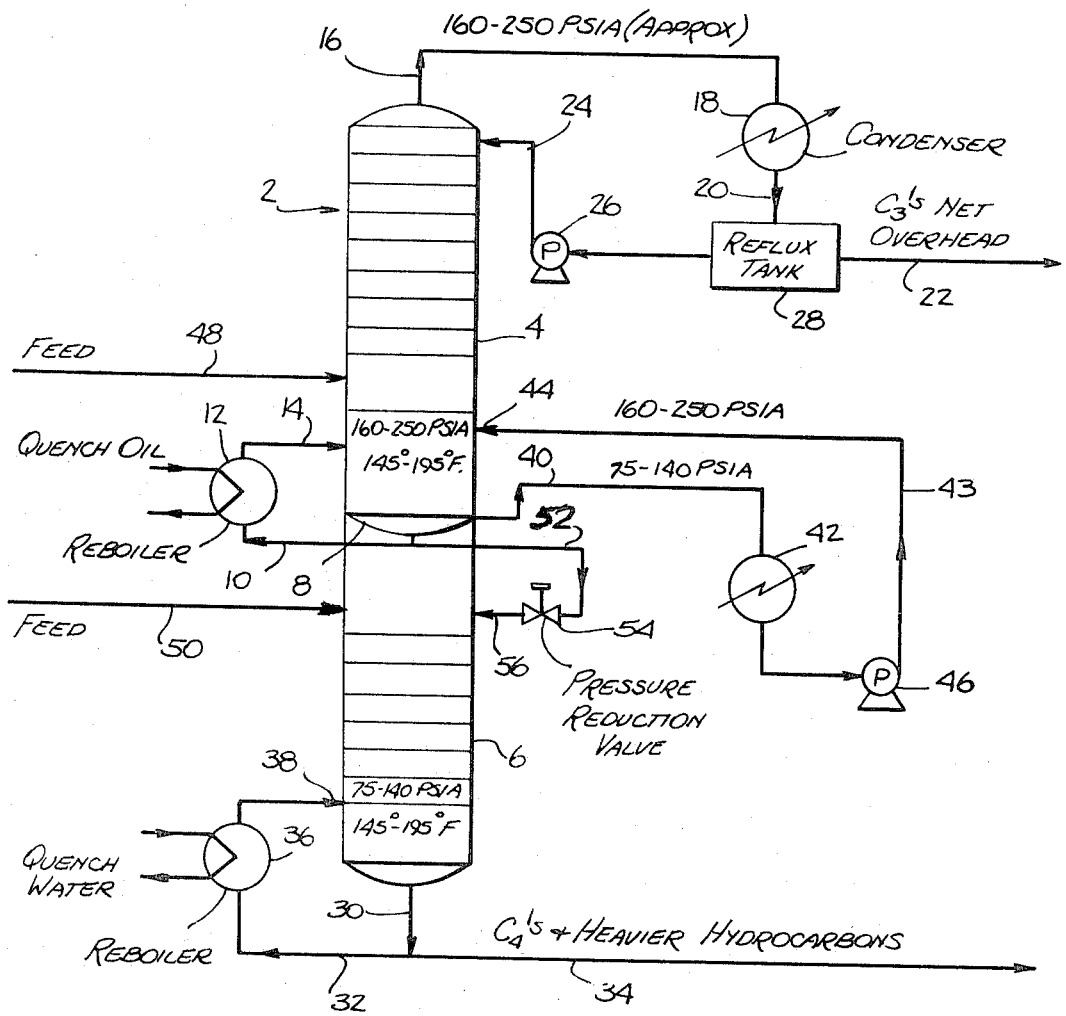

3,783,126
FRACTIONATING HYDROCARBONS IN A DUAL PRESSURE FRACTIONATION TOWER
Gardner L. Hayward, Belmont, and Edwin C. Meilun, South Weymouth, Mass., assignors to Stone & Webster Engineering Corporation, Boston, Mass.
Filed Sept. 22, 1971, Ser. No. 182,714
Int. Cl. C10g 7/00
U.S. Cl. 208—351                           4 Claims

ABSTRACT OF THE DISCLOSURE

A dual pressure fractionation tower having a high-pressure section and a low-pressure section and the fractionation process using a high-pressure section and a low-pressure section. Communication is provided between the high-pressure and low-pressure sections of the passage of the light ends from the low-pressure fractionation section to the high-pressure fractionation section and for passage of heavy ends from the high-pressure section to the low-pressure section. Both fractionation tower sections are provided with reboilers through which section bottoms are passed for recirculation to heat the fractionation tower sections. Condensers are also provided to condense the vapors from both fractionation tower sections.

BACKGROUND OF THE INVENTION

Field of the invention

The invention relates generally to fractionation towers and fractionation processes. More particularly, the invention has application to fractionation processes in which the vapor pressure of the desired respective tower bottoms and tower tops are markedly different. The invention is particularly suitable for use in depropanizing fractionation.

Summary of the prior art

At present, fractionation such as depropanizing is achieved in a fractionating process using a single fractionating tower. Therein, $C_3$'s are taken overhead along with any lower boiling hydrocarbons present in the feed. $C_4$'s and higher boiling hydrocarbons are removed from the bottom of the tower as liquid. A portion of the $C_4$'s and higher boiling hydrocarbons which are removed from the bottom of the tower are recirculated through a reboiler and introduced into the bottom of the tower to provide the heat necessary to generate the vapors required in the fractionation process. The light ends, such as the $C_3$'s and lower boiling hydrocarbons, are taken overhead and at least partially condensed with a portion thereof being returned to the top of the fractionating tower.

In the conventional depropanizer a single pressure is maintained throughout the entire fractionating tower. That pressure is determined by the pressure at which sufficient vapor will condense in the condenser to provide the requisite liquid return to the tower. The condenser temperature is a function of the available cooling water. Therefore, if the available cooling water temperature is capable of reducing the temperature of the $C_3$'s passing therethrough to 95° F., the pressure in the fractionating tower must be that pressure at which $C_3$'s will condense when exposed to 95° F. temperature. With the fractionation tower pressure fixed, a temperature must be chosen to vaporize the $C_3$'s from the liquid existing at the bottom of the tower. Thus, the tower bottoms are exposed to a temperature which is higher than desirable. $C_4$'s and heavier hydrocarbons in the tower bottoms are recirculated through the reboiler and exposed to this higher temperature and, as a consequence, some of them polymerize. Polymerization of the bottoms causes severe fouling of the reboilers and, in many cases, fouling of the lower fractionating trays in the tower.

Attempts to solve the problems caused by fouling due to polymerization of the $C_4$'s and various other hydrocarbons have generally been directed to the provision of spare equipment. For example, spare reboilers and spare lower tower sections have been installed so that one could be operated while the fouled equipment was cleaned.

Another approach to reducing reboiler and tower fouling has been to operate the entire fractionating tower at a considerably lower pressure than that required for condensing the $C_3$'s using water cooling. Although operation of the tower at a lower pressure results in a significantly low reboiler temperature and thus less polymerization of the tower bottoms, the tower operating cost is necessarily increased. This is because when the pressure in a depropanization tower is reduced to a pressure level below that which affords condensation of the overhead $C_3$ vapors at a temperature provided by the surface coolant, refrigeration must be employed to afford condensation of the $C_3$ vapors. In addition, the low-pressure tower must be larger than one operating at a higher pressure, thereby increasing the tower cost.

SUMMARY OF THE INVENTION

The present invention makes use of two fractionating sections, i.e. a high-pressure fractionation tower section and a low-pressure fractionation tower section. The structure affords the use of different temperatures and pressures in the respective sections. The pressure and temperatures for the high-pressure section can be chosen to be compatible with optimum vaporization of the $C_3$'s and condensation of the vapors at easily available temperatures. The temperatures and pressure of the low-pressure section can be chosen to provide the section with a temperature that will not render the bottoms susceptible to polymerization. Thus, recirculation of the bottoms through a reboiler will not cause fouling therein or fouling in the lower section of the tower.

The dual pressure fractionation tower is also provided with communication means to transfer the vapors from the top of the low-pressure section to an appropriate point in the high-pressure section. The communication line is provided with a condenser to liquify the vapor and a pump to elevate the pressure of the condensed liquid to that of the working pressure in the high-pressure section of the tower.

The high-pressure section of the tower is provided with a condenser for the overhead $C_3$'s and a return line which may include a reflux tank and a pump for the return of a portion of the condensed $C_3$'s.

The high-pressure tower section of the tower is also provided with a line adapted to recirculate a portion of the high-pressure tower section bottoms through a reboiler and back to the tower section to provide the necessary heat input to vaporize the recycled bottoms. Communication is also provided between the bottom of the high-pressure tower section and an appropriate inlet in the low-pressure tower section for a portion of the high-pressure tower section bottoms. The communication line from the high-pressure tower section bottom to the low-pressure tower section includes a pressure reduction valve or similar means which controls the introduction of the high-pressure tower section bottoms into the low-pressure tower section.

DESCRIPTION OF THE DRAWING

The invention will be better understood and made more apparent when considered in conjunction with the accompanying drawing wherein the figure depicts a dual pressure fractionation tower of the present invention provided with the necessary components and illustrative temperature, pressure and feed characteristics.

DESCRIPTION OF THE PREFERRED EMBODIMENT

The fractionation tower of the present invention, as shown in the accompanying drawing, is a single structure. From the structural standpoint, the fractionation tower could be separated into two distinct tower structures which are operated at the respective preferred pressures and temperatures for the particular service desired.

The figure depicts a single tower 2 comprised basically of a high-pressure fractionation tower section 4 and a low-pressure fractionation tower section 6. As is typical in fractionation towers, the upper tower section, which in the illustrated embodiment is the high-pressure section, may be provided primarily with rectifying trays. The lower tower section, which in the illustrated embodiment is a low-pressure section, may be provided principally with stripping trays. However, the precise distribution of rectifying trays and stripping trays is a function of the particular application to which the fractionation tower 2 is put and of the composition of the feed or feeds. A particular application may require that the high-pressure tower section 4 include several stripping trays near the bottom of the tower section 4. Alternatively, the high-pressure tower section 4 may be comprised totally of rectifying trays.

Similarly, the low-pressure tower section 6 may include several rectifying trays at the top or may be comprised completely of stripping trays.

As illustrated in the figure, the respective high-pressure tower section 4 and low-pressure tower section 6 are separated by a pressure-tight wall 8. Thus, the sections 4 and 6 are separate and distinct with complete pressure sealing therebetween. This design affords operation of the respective high-pressure section 4 and the low-pressure section 6 at different pressures.

The high-pressure section 4 is designed to utilize the wall 8 as its lower surface to collect the heavier material which drops to the bottom of the high-pressure tower section 4. A line 10 is provided to recycle a portion of the bottom material from the bottom of the high-pressure tower section 4 through a reboiler 12 to an opening 14 near the bottom of the high-pressure tower section 4. The reboiler 12 functions to introduce heat into the high-pressure tower section 4 by heating the fluid bottoms which are recycled through line 10. Any indirect heat transfer means can be used to serve as the reboiler. Hot oil and hot water, frequently obtained from vapor quench systems, and steam are typical of the heat transfer fluids used on the hot side of the reboiler 12.

The high-pressure tower section 4 is also provided with a line 16 extending from the top of the tower section 4 to deliver the vapor from the fractionation tower 2 to a condenser 18. A line 20 is provided to deliver the condensed vapor from the condenser 18 to line 22 for delivery to further processing equipment and to line 24 for return to the high-pressure tower section 4. In practice, it has been found desirable to provide line 24 with a pump 26 and a reflux tank 28.

The low-pressure fractionation tower section 6 is provided with a line 30 extending from the tower bottom and lines 32 and 34 which extend from line 30. Line 32 is designed to pass a portion of the tower bottoms through reboiler 36 wherein the lower bottoms are reheated and vaporized and introduced back into the low-pressure fractionation tower section 6 at opening 38. Reboiler 36 is heated in the same manner as described for reboiler 12. Line 34 conveys a portion of the tower bottoms to the other equipment for further processing.

A line 40 is provided at the top of the low-pressure fractionation tower section 6 to transfer the vapor from the top of the tower section 6 through a condenser 42 to the high-pressure fractionation tower section 4 at entry location 44. Due to the differential pressure between the low-pressure fractionation tower section 6 and the high-pressure fractionation tower section 4, the line 40 is provided with a pump 46 to elevate the pressure in the line 43 beyond the pump 46 to the pressure of the high-pressure fractionation tower section 4.

Feed lines are provided for the fractionation tower 2 as illustrated by entry lines 48 and 50. The locations of these lines are a function of the feed being introduced into the fractionation tower 2.

A line 52 is provided to transfer a portion of the bottoms from the high-pressure tower section 4 to low-pressure tower section 6. A pressure reduction valve 54 is provided in the line 52 to maintain a liquid level in the bottom of the high-pressure fractionation tower section 4 and the requisite pressure differential betweeen the high-pressure tower section 4 and the low-pressure tower section 6.

An example of the operation of the tower and the process will be considered with respect to operating conditions specific for depropanization.

The high-pressure fractionating tower section 4 is set to operate at approximately 160 to 250 p.s.i.a. and approximately 145 to 195° F. at the section bottom. The low-pressure fractionation tower section 6 is set to operate at approximately 75 to 140 p.s.i.a. and approximately 145 to 195° F. at the bottom of this section.

A feed of about 70 mol percent $C_3$'s and 30 mol percent $C_4$'s and heavier hydrocarbons is introduced into the tower section 4 through line 48. A feed of 12 mol percent $C_3$'s and 88 mol percent $C_4$'s and heavier hydrocarbons is introduced into tower section 6 through line 50. The heavier components of the feed introduced into the high-pressure fractionation tower section 4 drop to the bottom of the section 4 and are delivered to lines 10 and 52. The portion of the section bottoms delivered to line 10 is passed through reboiler 12 and the partly vaporized mixture is introduced into the high-pressure tower section 4 at a temperature of approximately 170° F. The temperature of the fluid (quench oil) passing through the hot side of the reboiler 12 is approximately 250° F. The portion of the section bottoms delivered to line 52 is passed through the pressure reduction valve 54 and introduced into the lower fractionation tower section at approximately 100 p.s.i.a.

The fluid which collects in the bottom of the low-pressure fractionation tower section 6 is passed through line 30 to lines 32 and 34. The portion of the fluid which passes through line 32 is returned to the low-pressure fractionation tower section 6 through reboiler 36. The fluid in line 32 is elevated to a temperature of approximately 165° F. and partly vaporized in the reboiler. The fluid in the hot side of the reboiler 36 is quench water at a temperature of 180° F. The portion of the fluid from the low-pressure fractionation tower section 6 which is passed through line 34 is sent to another section for further processing.

The vapors taken overhead in the low-pressure fractionation tower 6 are passed through line 40 at 100 p.s.i.a. to the condenser 42 wherein the vapors are liquified. The fluid passing through the cold side of the condenser 42 is cooling water. The condensed fluid discharged from the condenser 42 is at a temperature between 75° and 120° F., such as 95° F. The fluid leaving the condenser 42 is then elevated by the pump 46 to the same approximate pressure as the pressure in the high pressure fractionation tower section 4. In this particular example, the condensed fluid is elevated to a pressure of 215 p.s.i.a. The condensed fluid is then introduced through line 43 into the high-pressure fractionation tower section 4 through opening 44.

The fractionation operation occurring in the high-pressure fractionation tower section 4 generates $C_3$ vapors and other light hydrocarbons which are taken overhead through line 16 and delivered to condenser 18. The vapors which condense in condenser 18 are cooled to a temperature between 75° to 110° F., such as 95° F. by cooling water in the cold side of the condenser 18. The condensed fluid is distributed from the condenser discharge line 20 to line 22 and line 24. The portion of the condensed fluid delivered to line 24 is returned to the high-pressure fractionation tower section 4 at a pressure of about 215 p.s.i.a. and a temperature of 95° F.

The invention of the present patent application is particularly suitable for depropanizing operations. However, the process will have utility in any environment where fractionation can be enhanced in a dual pressure operation.

We claim:

1. A process for the depropanizing fractionation of hydrocarbons comprising the steps of:
    maintaining a high pressure fractionating tower section at a pressure in the range 160–250 p.s.i.a. and a temperature in the range 145°–195° F.;
    maintaining a low pressure fractionating tower section at a pressure in the range 75–140 p.s.i.a. and which is less than the pressure in the high pressure fractionating tower section, and at a temperature in the range 145°–195° F.;
    delivering a hydrocarbon feed to be depropanized to one of the fractionation tower sections;
    heating a portion of the bottoms fluid from the low-pressure fractionation tower section and which consists primarily of $C_4$'s and heavier hydrocarbon to a temperature in the range 145°–195° F., and returning said heated bottom fluid to the low-pressure fractionation section;
    condensing the overhead vapors from the low-pressure fractionation tower section;
    elevating the pressure of the condensed fluid from the condenser to the pressure of the high-pressure fractionation tower section;
    delivering the pressurized fluid to the high-pressure fractionation tower section;
    reducing the pressure of a first portion of the bottoms fluid from the high-pressure fractionation tower section and delivering said depressurized bottoms fluid to the low-pressure fractionation section;
    heating a portion of the bottoms fluid from the high-pressure fractionation tower section to a temperature in the range 145°–195° F. and returning said heated bottoms fluid to the high-pressure fractionation tower section;
    condensing the overhead vapors consisting primarily of $C_3$'s from the high-pressure fractionation tower section; and
    returning a portion of the condensed fluid from the high-pressure fractionation tower section to the high-pressure fractionation tower section.

2. A process as in claim 1 wherein the fluid returned to the low-pressure fractionation tower section is heated to approximately 165° F. prior to re-entry into said section.

3. A process as in claim 2 wherein the portion of the bottoms from the high-pressure fractionation tower section which is returned to the high-pressure fractionation tower section is heated to a temperature of approximately 170° F. prior to re-entry into said section.

4. A process as in claim 3 wherein the vapor taken from the low-pressure fractionation tower section is condensed at a temperature of 75 to 120° F. and the vapor taken overhead from the high-pressure fractionation tower section is condensed at a temperature of 75 to 110° F.

References Cited
UNITED STATES PATENTS

| | | | |
|---|---|---|---|
| 2,070,864 | 2/1937 | Ragatz | 208—355 |
| 2,277,387 | 3/1942 | Carney | 208—351 |
| 2,666,019 | 1/1954 | Winn et al. | 208—351 |
| 3,313,724 | 4/1967 | Kniel | 208—351 |
| 2,168,316 | 8/1939 | Brandt | 208—351 |

HERBERT LEVINE, Primary Examiner

U.S. Cl. X.R.

196—100; 202—173; 203—74; 208—355